(12) United States Patent  
Bernardi et al.

(10) Patent No.: US 12,129,367 B2
(45) Date of Patent: Oct. 29, 2024

(54) METHOD OF 3D PRINTING, AND RESULTING ARTICLE HAVING POROUS STRUCTURE

(71) Applicant: Braskem America, Inc., Philadelphia, PA (US)

(72) Inventors: Alessandro Bernardi, Pittsburgh, PA (US); Peter Dias, Pittsburgh, PA (US); Barbara Iria Mano, Sao Paulo—SP (BR); Juliana Breda Soares, Sao Paulo—SP (BR)

(73) Assignee: Braskem America, Inc., Philadelphia, PA (US)

( * ) Notice: Subject to any disclaimer, the term of this patent is extended or adjusted under 35 U.S.C. 154(b) by 0 days.

(21) Appl. No.: 18/329,633

(22) Filed: Jun. 6, 2023

(65) Prior Publication Data

US 2023/0312892 A1 Oct. 5, 2023

Related U.S. Application Data

(62) Division of application No. 16/954,829, filed as application No. PCT/US2018/066990 on Dec. 21, 2018, now Pat. No. 11,718,735.

(60) Provisional application No. 62/609,797, filed on Dec. 22, 2017.

(51) Int. Cl.
  *C08L 23/06* (2006.01)
  *B29C 64/153* (2017.01)
  *B33Y 10/00* (2015.01)
  *B33Y 70/00* (2020.01)
  *B29K 23/00* (2006.01)

(52) U.S. Cl.
  CPC .............. *C08L 23/06* (2013.01); *B33Y 70/00* (2014.12); *B29C 64/153* (2017.08); *B29K 2023/065* (2013.01); *B29K 2023/0683* (2013.01); *B33Y 10/00* (2014.12); *C08L 2205/025* (2013.01); *C08L 2207/062* (2013.01); *C08L 2207/068* (2013.01)

(58) Field of Classification Search
  CPC . C08L 23/06; B33Y 70/00; B29K 2023/0683; B29K 2023/065; B29C 64/153
  See application file for complete search history.

(56) References Cited

U.S. PATENT DOCUMENTS 10,933,593 B2 * 3/2021 Koelling ................. C08L 23/06

* cited by examiner

*Primary Examiner* — Catherine S Branch
(74) *Attorney, Agent, or Firm* — Duane Morris LLP (57) ABSTRACT

A composition for three-dimension (3D) printing, a method for 3D printing, and a resulting article having porous structure are provided. Such a composition includes from 50% to 100% by weight of a base polymer comprising polyolefin (such as ultra-high molecular weight polyethylene), from 0% to 50% by weight of a glue polymer (such as HDPE or PP), and optionally additive. A composition can be applied in a layer, and the base polymer and the glue polymer each has a predetermined size or size distribution. The composition is sintered in a selected area to form a layer of a solid article, which has a predetermined pore size or pore size distribution. The predetermined particle size or size distribution for each of the base polymer and the glue polymer is determined through computer simulation based on the predetermined pore size or pore size distribution in the layer of the solid article.

8 Claims, 9 Drawing Sheets

METHOD OF 3D PRINTING, AND RESULTING ARTICLE HAVING POROUS STRUCTURE

CROSS-REFERENCE TO RELATED APPLICATIONS

This application is a divisional of U.S. application Ser. No. 16/954,829, which was filed on Jun. 17, 2020, itself a U.S. national phase application of PCT/US2018/066990, which was filed on Dec. 21, 2018, which claims the benefit of U.S. Provisional Application No. 62/609,797, filed Dec. 22, 2017, which application is expressly incorporated by reference herein in its entirety.

FIELD OF THE INVENTION

The disclosure relates to polymers and processing generally. More particularly, the disclosed subject matter relates to a method of making a polyolefin based article through 3D printing, and the resulting article having a porous structure.

BACKGROUND 3D printing technologies are used in making solid parts, and include different processes. For example, 3D printing may involve the use of an inkjet type print head to deliver a liquid or colloidal binder material to layers of a powdered build material. The printing technique involves applying a layer of a powdered build material to a surface typically using a roller. After the build material is applied to the surface, the print head delivers the liquid binder to predetermined areas of the layer of material. The binder infiltrates the material and reacts with the powder, causing the layer to solidify in the printed areas by, for example, activating an adhesive in the powder. The binder also penetrates into the underlying layers, producing interlayer bonding. After the first cross-sectional portion is formed, the previous steps are repeated, building successive cross-sectional portions until the final object is formed. This 3D printing technique is generally used for polar polymers, and is not used for polyolefins.

Selective laser sintering (SLS) is an additive manufacturing (AM) technique that uses a laser as the power source to sinter powdered material, aiming the laser automatically at points in space defined by a 3D model, binding the material together to create a solid structure.

High Speed Sintering (HSS) is another additive manufacturing technique, in which a fine layer of powder is deposited onto the surface of a powder bed, an inkjet printhead then selectively prints heat or infrared (IR) absorbing fluid (or ink) directly on to the powder surface. The entire surface is heated or irradiated with IR energy causing only the printed areas to melt/sinter, the unprinted areas remain as powder. This process is repeated layer by layer until a product is complete, un-sintered powder is then removed to reveal the final part(s). Depending on bed size and part shape, this process is up to 100 times faster than a general 3D printing technique, with the potential to produce up to 100,000 parts a day. Faster production and freedom from tooling means more complex parts can be build and re-designed on demand, in higher volumes and lower cost than ever before.

A porous plastic filter is used for separating, by filtration, fine particles contained in a fluid such as a liquid or gas. For example, such fine particles may be dust in air. The surface of a porous substrate may be made of a polymer.

SUMMARY OF THE INVENTION

The present disclosure provides a method of making an article having porous structure, and the resulting article. The method may include a step of 3D printing. For example, the method includes selective laser sintering (SLS), high speed sintering (HSS), or any combination thereof. The starting material and the article comprise ultra-high molecular weight polyethylene (UHMWPE), high density polyethylene (HDPE), any other suitable polyolefin, or a combination thereof. The article has a porous structure, in which the pores are uniformly sized and distributed. The article can be used as a filter.

In some embodiments, the starting material comprises a base polymer such as ultra-high molecular weight polyethylene (UHMWPE), and a glue polymer such as high density polyethylene (HDPE) or any other suitable polyolefin.

The base polymer such as the UHMWPE may have different grades of different sizes. Each grade may be applied to each of different layers. For example, UHMWPE may have a particle size in a range of from 5 microns to 600 microns (e.g., 40-100 microns, 50-100 microns, 60-100 microns, 10-500 microns, 100-500 microns or any range combination) in some embodiments. In some embodiments, the UHMWPE has an average particle size equal to or lower than 300 microns.

The base polymer may have a suitable particle shape such as spherical, near spherical shape, or potato shape. In some embodiments, the base polymer has a shape of spheroid. The base polymer may have a suitable surface area. The base polymer content by weight is in a range of from 50% to 100% (e.g., 60-100%, 70-100%, 80-100%, 85-100%, 95-100%, 98-100%, 90-98%) based on the total weight of the polymers (or the total weight of the ingredients) in the starting material.

The base polymer such as the UHMWPE may have different grades of different molecular weights. Each grade may be applied to each of different layers. For example, UHMWPE may have a molecular weight in a range of from $1\times10^6$ to $1.6\times10^7$ g/mol (e.g., $1-16\times10^6$ g/mol, $1-12\times10^6$ g/mol, $1-8\times10^6$ g/mol, $1-3\times10^6$ g/mol or any range combination) in some embodiments.

The glue polymer such as HDPE may have any suitable particle size and surface area. The particle size can be adjusted based on the particle sizes of the base polymer. For example, HDPE or other polyolefin may have a particle size in a range of from 1 micron to 250 microns (e.g., 10-50, 10-40, 10-30, 5-60, 10-100, 10-250 microns or any other range combination) in some embodiments. In some embodiments, the glue polymer may have an average particle size equal to or lower than 250 microns. The glue polymer may have a suitable particle shape such as spherical, near spherical, or potato shape. In some embodiments, the glue polymer has a shape of spheroid. The glue polymer may have a suitable surface area. The glue polymer content by weight is in a range of from 0% to 50% (e.g., 0-30%, 0-20%, 0-15%, 0-5%, 0-2%, 2-10%, 0.1-30%, 0.1-20%, 0.1-15%, 0.1-5%, 0.1-2%) based on the total weight of the polymers (or the total weight of the ingredients) in the starting material.

In some embodiments, the average particle size of the base polymer is higher than the average particle size of the glue polymer.

In some embodiments, the starting material may contain one or more additives. The additives may have a particle size in a range from several nanometers to several microns (e.g., from 10 nm to 10 microns). For example, the starting material may contain clay carbon based additives (e.g. graphite and graphene), adhesives, sealants, gypsum or clays, silicates, or various phase change materials. The additives can increase thermal conductivity of the compound. The content of the additives may be equal to or less than 2% or 20,000 ppm by weight in the total weight of the formulation.

In some embodiments, the method of making an article having a porous structure comprises several steps: applying the starting material in a layer (or layer by layer) having a predetermined particle size, laser sintering the starting material to form a layer or a portion of a solid article. The starting material may be applied by using a roller or any other 3D printing method. During the laser sintering step, the particles melts and/or fuses together to form a porous structure. The base polymer may melt but not flow. The glue polymer may have lower melting point than that of the base polymer so that the glue polymer can melt and flow. The method may also comprise generating a 3D model, which includes a layer-by-layer structure and the starting materials having a predetermined particle size for each layer in the layer-by-layer structure.

In another aspect, the present disclosure provides a resulting 3D article or object. Such an article comprises the base polymer, the glue polymer, and optionally additives as described. The article has a suitable porosity with a suitable pore size and size distribution. The pore size can be uniformly distributed throughout the article. For example, desired porosity (i.e. volume %) may be in any suitable range, for example, 5-60%, 10-60%, 20-60%, or 30-50%. The pores may be in any suitable size, for example, an average of about 0.1 micron, 0.2 micron, 0.22 micron, 0.45 micron, 0.8 micron, 5 microns, 10 microns, or up to 70 microns. The average pore size may have a standard deviation in a percentage of 5%, 10%, 15%, or 20%. In some embodiments, there may be a gradient of pore sizes.

In another aspect, the present disclosure provides a method for producing a porous article through additive manufacturing. Such a method comprises selecting a base polymer. The base polymer comprises a polyolefin, and has a particle size in a range of from about 5 microns to about 600 microns and/or an average particle size equal to or lower than 300 microns, and a bulk density less than 0.80 g/cm$^3$. The method further comprises selecting a glue polymer, which has a particle size in a range from about 1 micron to about 250 microns and/or an average particle size equal to or lower than 250 microns. In some embodiments, the base polymer is from 50% to 100% by weight, and the glue polymer is from 0% to 50% by weight of a glue polymer. In some embodiments the base polymer has an average particle size higher than the glue polymer average particle size. The method further comprises supplying the base polymer and the glue polymer in a layer, and sintering the base polymer and the glue polymer selectively in a selected area of the layer to form a layer of solid article.

In another aspect, the present disclosure also provides a porous article made using additive manufacturing. The porous article comprises a base polymer, which comprises polyolefin. The article has a porosity less than 60% by volume and an average pore size of less than 70 microns. The porous article comprise the base polymer in an amount from 50% to 100% by weight in some embodiments. The porous article may further comprise from 0% to 50% by weight of a glue polymer as described. In some embodiments, the base polymer is UHMWPE and the glue polymer is HDPE.

BRIEF DESCRIPTION OF THE DRAWINGS

The present disclosure is best understood from the following detailed description when read in conjunction with the accompanying drawings. It is emphasized that, according to common practice, the various features of the drawings are not necessarily to scale. On the contrary, the dimensions of the various features are arbitrarily expanded or reduced for clarity. Like reference numerals denote like features throughout specification and drawings.

FIG. 9A(1)-(3) show images with 60× magnification. FIG. 9B(1)-(3) show images with 100× magnification. FIG. 9C(1)-(3) show images with 200× magnification.

DETAILED DESCRIPTION

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" refer to a relationship wherein structures are secured or attached to one another either directly or indirectly through intervening structures, as well as both movable or rigid attachments or relationships, unless expressly described otherwise.

For purposes of the description hereinafter, it is to be understood that the embodiments described below may assume alternative variations and embodiments. It is also to be understood that the specific articles, compositions, and/or processes described herein are exemplary and should not be considered as limiting.

In the present disclosure the singular forms "a," "an," and "the" include the plural reference, and reference to a particular numerical value includes at least that particular value, unless the context clearly indicates otherwise. Thus, for example, a reference to "a nano structure" is a reference to one or more of such structures and equivalents thereof known to those skilled in the art, and so forth. When values are expressed as approximations, by use of the antecedent "about," it will be understood that the particular value forms another embodiment. As used herein, "about X" (where X is a numerical value) preferably refers to ±10% of the recited value, inclusive. For example, the phrase "about 8" preferably refers to a value of 7.2 to 8.8, inclusive; as another example, the phrase "about 8%" preferably (but not always) refers to a value of 7.2% to 8.8%, inclusive. Where present, all ranges are inclusive and combinable. For example, when a range of "1 to 5" is recited, the recited range should be construed as including ranges "1 to 4", "1 to 3", "1-2", "1-2 & 4-5", "1-3 & 5", "2-5", and the like. In addition, when a list of alternatives is positively provided, such listing can be interpreted to mean that any of the alternatives may be excluded, e.g., by a negative limitation in the claims. For example, when a range of "1 to 5" is recited, the recited range may be construed as including situations whereby any of 1, 2, 3, 4, or 5 are negatively excluded; thus, a recitation of "1 to 5" may be construed as "1 and 3-5, but not 2", or simply "wherein 2 is not included." It is intended that any component, element, attribute, or step that is positively recited herein may be explicitly excluded in the claims, whether such components, elements, attributes, or steps are listed as alternatives or whether they are recited in isolation.

A laser sintering process such as a selective laser sintering (SLS) or high speed sintering (HSS), is a type of 3D printing process. In this process, a polymer powder can be applied in a thin layer on a substrate or on a top surface of a building platform. Laser, which may be controlled by a computer, hits and sinters the polymer powder in selected areas. The polymer particles must have an adequate size, size distribution and morphology.

UHMWPE is a polymer that melts but does not flow. This creates a challenge on 3D printing process because the lack of pressure does not promote a good sintering of the particles, and the resulting parts do not have enough strength. UHMWPE does not flow after melted, so the particles maintain the same shape. After sintering, the resulting article is very porous and has low strength.

On the other hand, HDPE has a same chemical nature of UHMWPE, but a lower molecular weight allows HDPE to melt and flow. Meanwhile, HDPE can be used for making porous sintered parts such as filters.

The present disclosure provides a method of making an article having porous structure, through a step of 3D printing. In some embodiments, the method includes selective laser sintering (SLS), high speed sintering (HSS), or any combination thereof. The starting material comprises ultra-high molecular weight polyethylene (UHMWPE), high density polyethylene (HDPE), any other suitable polyolefin, or a combination thereof. The article has a porous structure, in which the pores are uniformly sized and distributed. The article can be used as a filter. In some embodiments, the starting material comprises a base polymer such as UHMWPE, and a glue polymer such as HDPE or any other suitable polyolefin.

The invention can overcome the technical barrier of 3D printing UHMWPE by developing a product with better flow characteristics, and particle morphology, size and distribution. For the filtration and porous parts, the same product design can be utilized to promote an improvement on the filtration performance.

In some embodiments, a glue polymer such as HDPE is used in combination with a base polymer such as UHMWPE. The invention can overcome technical barriers by providing a polymer in the solid state with suitable powder flowability, morphology, size and distribution, for production of porous or solid parts.

UHMWPE and HDPE with defined particles size, particle size distribution and additives may be blended to make porous articles. For example, the mixture is pressed under a defined temperature where the sintering occurs and results in a part with a porosity distribution. By the microscope analysis, the resulting articles contain both big pores and small pores in the final part. The overall porosity distribution is not uniform.

Pores exist inherently in selective laser sintering (SLS) parts due to incomplete powder coalescence, which can be minimized by imparting more energy to the particles either through the higher laser energy density and/or smaller layer thickness. However, advantages can be taken from the inherent porosity to produce porous parts. Through selective laser sintering (SLS) or high speed sintering (HSS), the resulting porosity and pore size distribution are uniform in accordance with some embodiments.

Base Polymer:

In some embodiments, the base polymer is UHMWPE. UHMWPE is a thermoplastic having a molecular weight (Mw) in a range from about $1\times10^6$ to 16 $10^6$ g/mol and an intrinsic viscosity from about 4 to 40 dL/g. The base polymer may have different grades of different sizes. Each grade may be applied to each of different layers. For example, UHMWPE may have a particle size in a range of from 5 microns to 600 microns (e.g., 40-100 microns, 50-100 microns, 60-100 microns, 10-500 microns, 100-500 microns, or any other range combination) in some embodiments. Particle size distribution can be enhanced for the application (using size exclusion sieves). The "particle size" described herein refers to a diameter or the largest length in one dimension. The base polymer may have a suitable particle shape such as spherical, near spherical, or potato, shape. In some embodiments, the base polymer has a shape of spheroid. The base polymer may have a suitable surface area. The base polymer content by weight is in a range of from 50% to 100% (e.g., 50-99%, 60-100%, 70-100%, 80-100%, 85-100%, 95-100%, 98-100%, 90-98%) based on the total weight of the polymers (or the total weight of the ingredients) in the starting material.

Figure 1A:
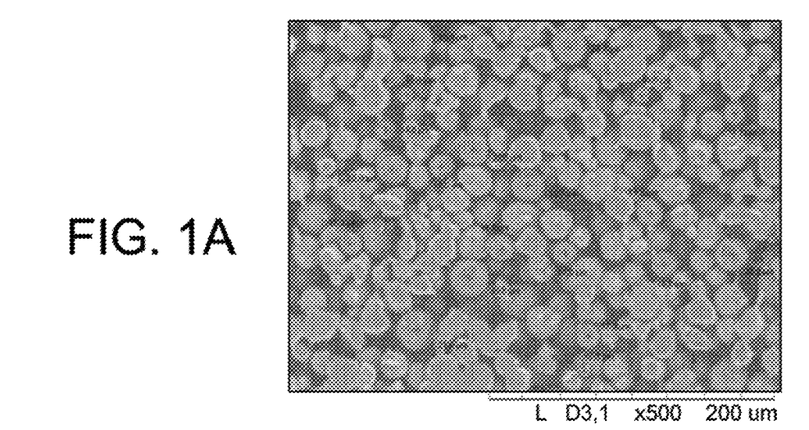
FIGS. 1A-1C illustrate the particle shape and particle size distribution of UHMWPE, which remain the same even after melted.
Figure 1B:
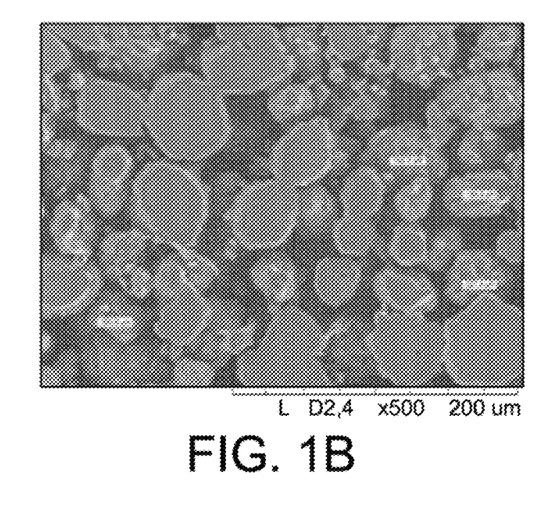
Figure 1C:
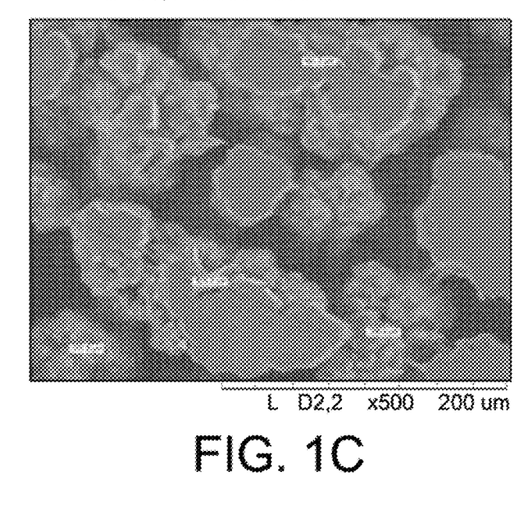

Particle size distribution is tailored to achieve the desired porosity distribution. Referring to FIGS. 1A-1C, even after melt, UHMWPE keeps its original particle shape and particle size distribution. UHMWPE does not flow when melted due to its ultra-high molecular weight. Particles shapes are also tailored to change average porosity, porosity distribution and additives and fillers dispersion. As described herein, in some embodiments, a particle may have spherical, near-spherical, or potato shape, and a particle size may refer to the diameter of the particle, or the largest size in one dimension. A pore size may refer to a diameter of a pore. A potato shape may be slightly elongated with relatively smooth surface in some embodiments.

UHMWPE can be available from Braskem under trade name UTEC®, which melts at 132-145° C., but it does not flow. UTEC's molecular weight is about 10 times greater than high density polyethylene (HDPE) resins. Its molecular weight is in the low range (1 million g/mol) and extends to a high range (7 to 10 million g/mol).

In some embodiments, the base polymer can be also HDPE instead of UHMWPE.

Glue Polymer:

In some embodiments, the glue polymer is HDPE or any other suitable polyolefin. The glue polymer such as HDPE may have any suitable particle size and surface area. The particle size can be adjusted based on the particle sizes of the base polymer. For example, HDPE or other polyolefin may have a particle size in a range of from 1 micron to 250 microns (e.g., 10-50, 10-40, 10-30, 5-60, 10-100 microns or any other range combination) in some embodiments. The glue polymer may have a suitable particle shape such as spherical, near spherical, or potato shape. In some embodiments, the glue polymer has a shape of spheroid. The glue polymer may have a suitable surface area. The glue polymer content by weight is in a range of from 0% to 50% (e.g., 1-50%, 0-40%, 0-30%, 0-20%, 0-15%, 0-5%, 0-2%, 2-10%, 0.1-30%, 0.1-20%, 0.1-15%, 0.1-5%, 0.1-2%) based on the total weight of the polymers (or the total weight of the ingredients) in the starting materials.

The glue polymer is designed based on each particle layer. Melting characteristics, particle size, and shape are designed for each layer, resulting in a homogeneous morphology of the porosity and strength of a resulting article (e.g., a filter).

Additives:

Additives are optional. The starting material may contain one or more additives in some embodiments. The additives may include one or more additives, which absorb heat or IR. The additives may have a particle size in nanometer or micrometer level (e.g., from 10 nm to 10 microns). For example, the starting material may contain clay carbon based additives (e.g. graphite and graphene), adhesives, sealants, gypsum or clays, silicates, or various phase change materials. Sometimes additives are used to increase thermal conductivity of the formulation. The content of the additives may be equal to or less than 2% or 20,000 ppm by weight in the total weight of the formulation in some embodiments.

Method:

The present disclosure provides a method of making an article having a porous structure. Such a method may comprise several steps: applying the starting material in a layer (or layer by layer) having a predetermined particle size, laser sintering the starting material to form a layer or a portion of a solid article. The starting material may be applied by using a roller or any other 3D printing method. During the laser sintering step, the particles melts and/or fuses together to form a porous structure. The base polymer may melt but not flow. The glue polymer may have lower melting point than that of the base polymer so that the glue polymer can melt and flow. For example, in some embodiments, the base polymer may have a melting point in a range of from 130° C. to 136° C. The glue polymer may have a melting point a certain range such as 5-10° C., 5-15° C., or 10-15° C. degree lower than that of the base polymer. In some embodiments, the method comprises generating a 3D model. The model may include a layer-by-layer structure and the starting materials having a predetermined particle size for each layer in the layer-by-layer structure.

In the 3D printing process, the specific particles can be deposited layer by layer to achieve the desired average porosity and porosity distribution. Computer simulation is used to design the particles characteristics (size, shape, quantities) layer by layer. In some embodiments, the starting material only contains the base polymer and no glue polymer. The particles having different characteristics may be separated into different grades. The separation may be performed using sieves. Such a particle separation into different grades can be used to achieve the computer simulation targets by providing predetermined particle sizes and combinations.

Figure 2:
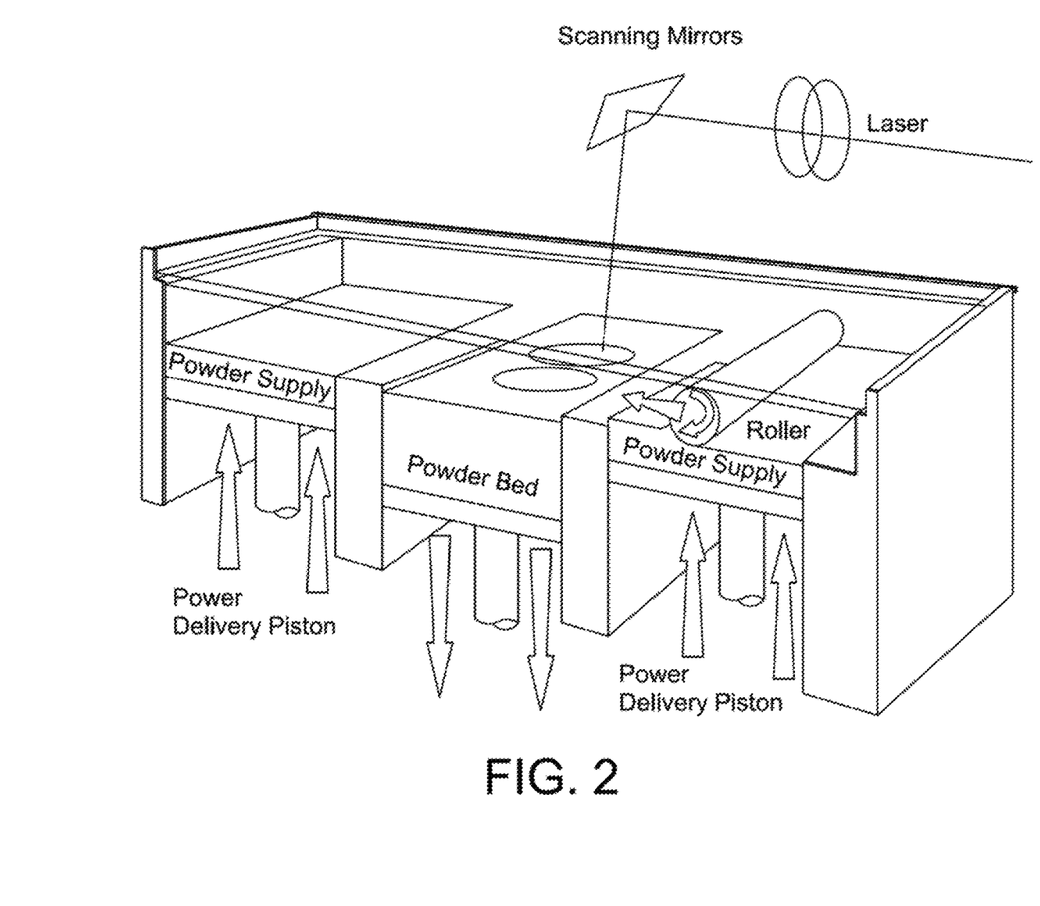
FIG. 2 illustrates an exemplary apparatus used for selective laser sintering (SLS) to print three-dimensional (3D) object in accordance with some embodiments.
Figure 3:
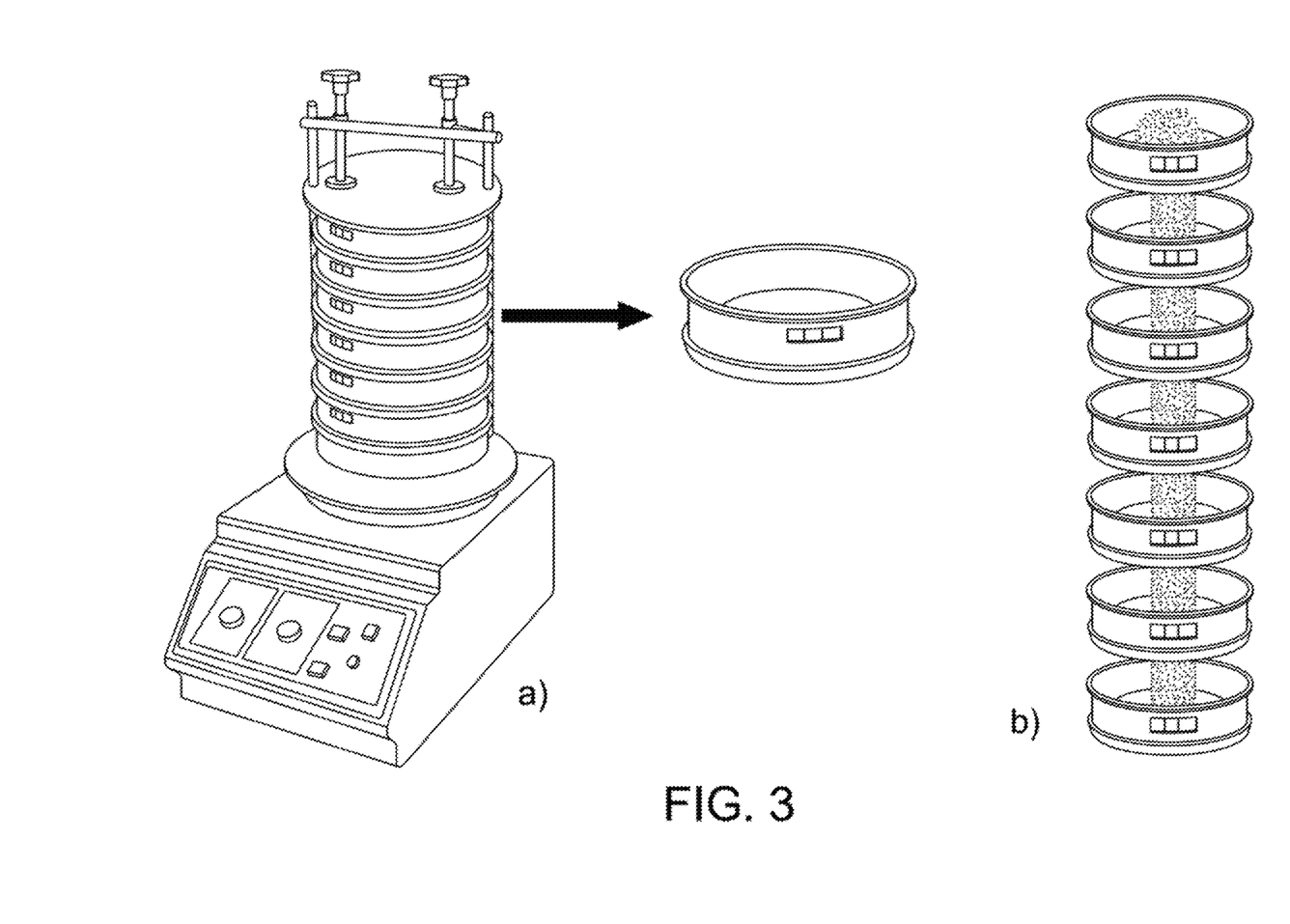
FIG. 3 illustrates an exemplary apparatus for sieving and separating particles into different sizes to be supplied to the exemplary apparatus of FIG. 3.

Referring to FIG. 2, a 3D printing technique involving SLS or HSS is used. A part can be produced layer by layer. A simulation can be performed to define the particles sizes for each layer and each layer thickness. Referring to FIG. 3, the UHMWPE particles can be sieved to different grades based on their particle sizes, and added to the 3D printer to achieve a much better porosity distribution. Adjustments on the laser parameters need to be done to achieve the right level of the particles sintering. A glue polymer and/or a polymer blend can be included into/between these layers to add additional features for the porous parts, depending on the final application. Surface treated particles and/or additives can be also included. In some embodiments, a glue polymer is HDPE, which has particle size, melt index, molecular weight, molecular weight distribution, and density different from UHMWPE. Others polymers also can be added with specific characteristics to have a final part that meets a better performance on the final application. Alternatively, in this invention, UHMWPE can be replaced by HDPE. To prepare a porous article, HDPE particle size distribution must be narrow, and the polymer must have a low bulk density to result in low packing. After sintering, voids between particles turn into an interconnected system with defined porous size. Particles can be sieved by each particle size and fed to 3D printer equipment to achieve defined porosity gradient over volume in the final article. Additionally, UHMWPE or HDPE and their combination thereof can be combined with NaCl or any particulate substance which can be selectively solubilized (leached) in a post sintering process to additional porosity.

UHMWPE melts but does not flow. The existing processes for UHMWPE requires high pressures and temperatures like pressing and RAM extruders that is not possible for 3D printing process. In the method provided in the present disclosure, the processability of UHMWPE can be improved by increasing the surface area so that each particle is in contact. For example, the powder bulk density can be increased by changing particle size, particle size distribution, and particle morphology/porosity. As in porous articles, computer simulation can be perform to define the particles size for each layer fed into the 3D printer. In addition to bulk density, the structure of UHMWPE can be so changed that it can have a better flowability of the melted particles that helps the sintering process to get final solid parts with a good mechanical strength.

In some embodiments, one aspect is to promote the base polymer such as UHMWPE flow. For example, UHMWPE particles may have a core/shell structure, where the shell has a low molecular weight enough to flow of the melted particle and have a good sintering. The core is the normal UHMWPE with good mechanical properties. For example, in some embodiments, the shell may be made of HDPE. In some embodiments, this base polymer can be produced using a bimodal technology with two reactors in series. The use of comonomers to adjust the melting behavior can also be used.

In some embodiments, another way to improve the flowability of the melted particles is to add polypropylene (PP) in a low percentage. The PP particles function as a lubricant for the UHWMPE particles. For example, UHWMPE and PP may be blended in pellet forms, and then processed to obtain a predetermined particle size and particle size distribution. Micronization or other technologies may be used to obtain fine particles comprising UHWMPE and PP.

In some embodiments, another way to promote a better melt flow of the UHMWPE is to reduce the chain entanglement in the particle by developing specific polymerization conditions and catalyst. Lower chain entanglement will promote high melt flow for the polymer and have a better sintering process.

In some embodiments, nanotechnology and/or additives can also be incorporated to the UHMWPE powder or particles to improve the thermal conductivity. That allows propagating faster the heat that the laser generates on the surface of the particles.

On the 3D printer machine, an environment with high pressure can simulate the pressure needed to have a better sintering for the UHMWPE particles. The pressure environment can be a gas (inert gas is preferable to avoid degradation) or liquid where could be better for pressure and temperature control. A pressure chamber can be developed to control de pressure and temperature during the 3D printing process. In addition to that, as UHMWPE melts but does not flow, this chamber can have temperature close or higher the UHMWPE melting point. This will help to accelerate the melting process and provide the particles with more time in contact for the chain diffusion among the particles.

Sintering can be also defined as coalescence of the particles. The inventive approaches described above might be applied for UHMWPE porous parts, and technical parts.

In some embodiments, the method provided in the present disclosure may include a post processing step after printing. In the post processing step, the porous parts is treated in an autoclave oven under a predetermined pressure and temperature for a period of time.

In another aspect, the present disclosure provides a method for producing a porous article through additive manufacturing. Such a method comprises selecting a base polymer. The base polymer comprises a polyolefin, and has a particle size in a range of from about 5 microns to about 600 microns, and a bulk density less than 0.80 g/cm$^3$. The method further comprises selecting a glue polymer, which has a particle size in a range from about 1 micron to about 250 microns. In some embodiments, the base polymer is from 50% to 100% by weight, and the glue polymer is from 0% to 50% by weight of a glue polymer. The method further comprises supplying the base polymer and the glue polymer in a layer, and sintering the base polymer and the glue polymer selectively in a selected area of the layer to form a layer of solid article.

Article:

A resulting 3D article or object such as a filter is also provided in the present disclosure. Such an article comprises the base polymer, the glue polymer, and optionally additives as described. The article has a suitable porosity with a suitable pore size and size distribution. The pore size can be uniformly distributed throughout the article. For example, desired porosity (i.e. volume %) may be in any suitable range, for example, 5-60%, 10-60%, 20-60%, or 30-50%. The pores may be in any suitable size, for example, an average of about 0.1 micron, 0.2 micron, 0.22 micron, 0.45 micron, 0.8 micron, 5 microns, 10 microns, or up to 70 microns. The average pore size may have a standard deviation in a percentage of 5%, 10%, 15%, or 20%. In some embodiments, there may be a gradient of pore sizes. In some embodiments, the article comprises UHMWPE, HDPE or a combination thereof.

In some embodiments, the resulting article is a filter comprising UHMWPE or HDPE. Through the method provided in the present disclosure, under the HSS and laser sintering process conditions, the particles melt and/or flow differently from UHMWPE, providing a good porous structure with good mechanical performance.

Figure 4:
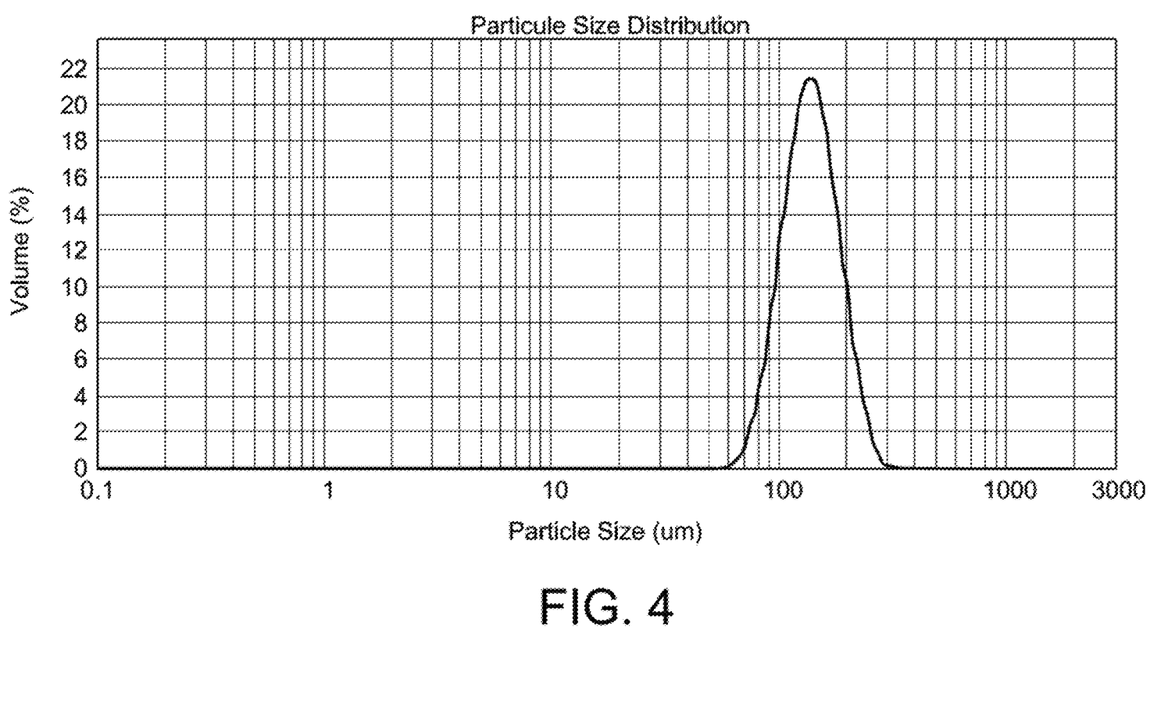
FIG. 4 illustrates an exemplary particle size distribution of UHMWPE used in some embodiments.
Figure 5:
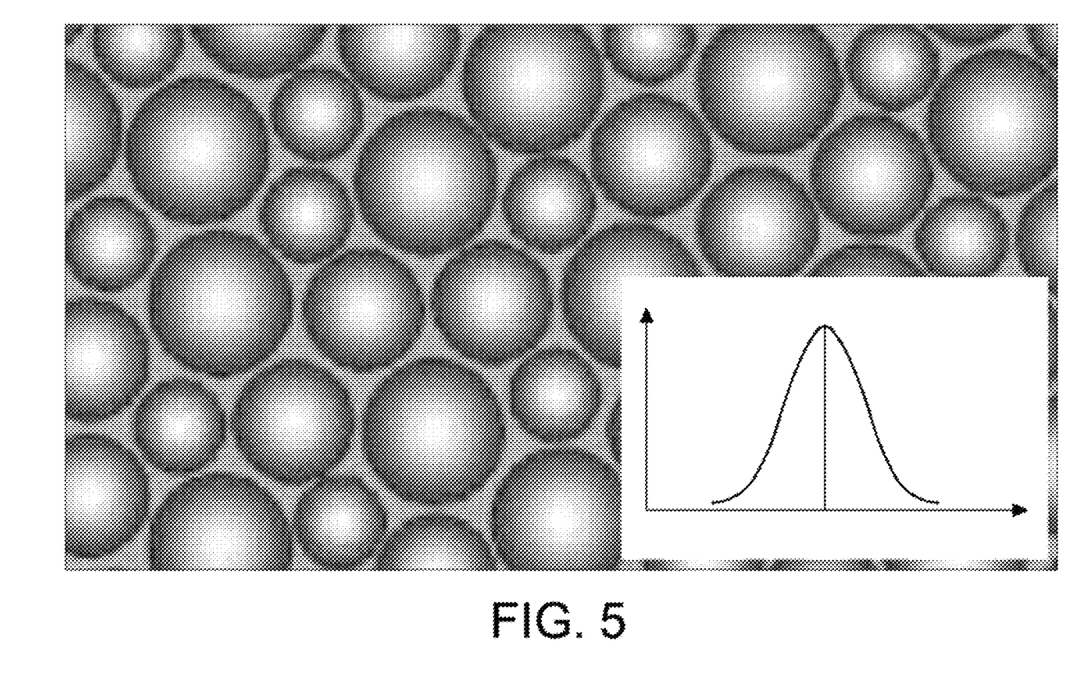
FIG. 5 illustrates an exemplary layer during computer simulation, showing a combination of UHMWPE (having larger particle sizes) and a glue polymer such as high density polyethylene (having smaller particle sizes) in accordance with some embodiments.

Referring to FIG. 4, UHMWPE may have a particle size distribution in a range of 60-120 microns used in some embodiments. Referring to FIG. 5, an exemplary layer during computer simulation is illustrated. Such an exemplary layer may include a combination of UHMWPE and HDPE in accordance with some embodiments. HDPE particles has a smaller particle size fill the space between the UHMWPE particles. The specific particle sizes can be adjusted based on the required resulting structures include pore size and pore size distribution. The computer simulation is used to determine a particle size distribution for making a porous part having a predetermined pore size in a given layer(s) and/or throughout the entire printed part.

Figure 6:
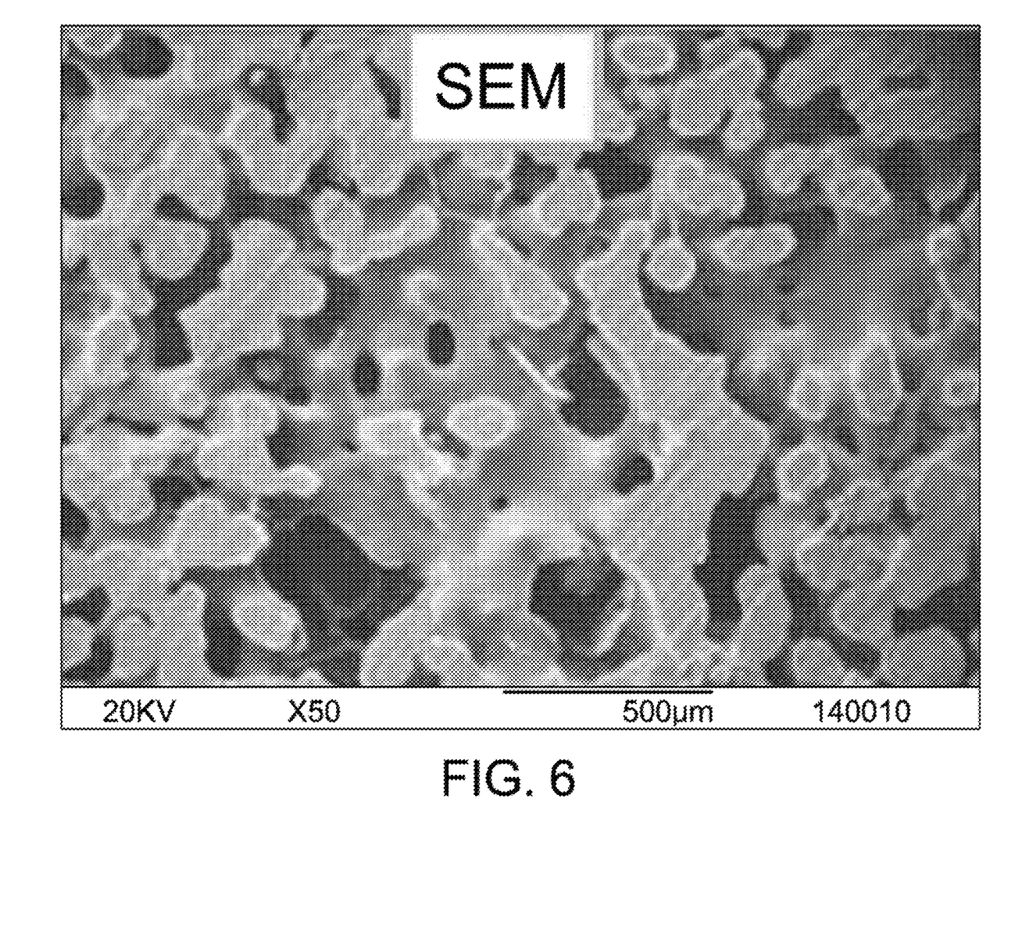
FIG. 6 illustrates a resulting porous structure with uniform pore size and pore size distribution in accordance with some embodiments.

Referring to FIG. 6, morphology for a resulting article having UHMWPE and HDPE is illustrated. The uniform pore size and porosity distribution are obtained by the layer-by-layer HSS or laser sintering process, based on a computer simulation.

In some embodiments, a composition can be applied in a layer, and the base polymer and the glue polymer each has a predetermined size or size distribution. The composition is sintered in a selected area to form a layer of a solid article, which has a predetermined pore size or pore size distribution. The predetermined particle size or size distribution for each of the base polymer and the glue polymer is determined through computer simulation based on the predetermined pore size or pore size distribution in the layer of the solid article. Different particle size and corresponding pore size can be used. For example, in some embodiments, an article may have a pore size of 20 microns, and the based polymer may include UHMWPE having particle size of about 500 microns. An article may have a pore size of 5 microns, and UHMWPE having particle size of about 10 microns or below can be used as a base polymer. The glue polymer may have smaller particle size accordingly.

In another aspect, the present disclosure also provides a porous article made using additive manufacturing. The porous article comprises a base polymer, which comprises polyolefin. The article has a porosity less than 50% or 60% by volume and an average pore size of less than 50 microns. The base polymer contact is from 50% to 100% by weight in some embodiments. The porous article may further comprise from 0% to 50% by weight of a glue polymer. In some embodiments, the base polymer is UHMWPE and the glue polymer is HDPE.

EXAMPLE

A starting material comprising 50% by weight of a UHMWPE and 50% by weight of a HDPE was prepared.

Figure 7:
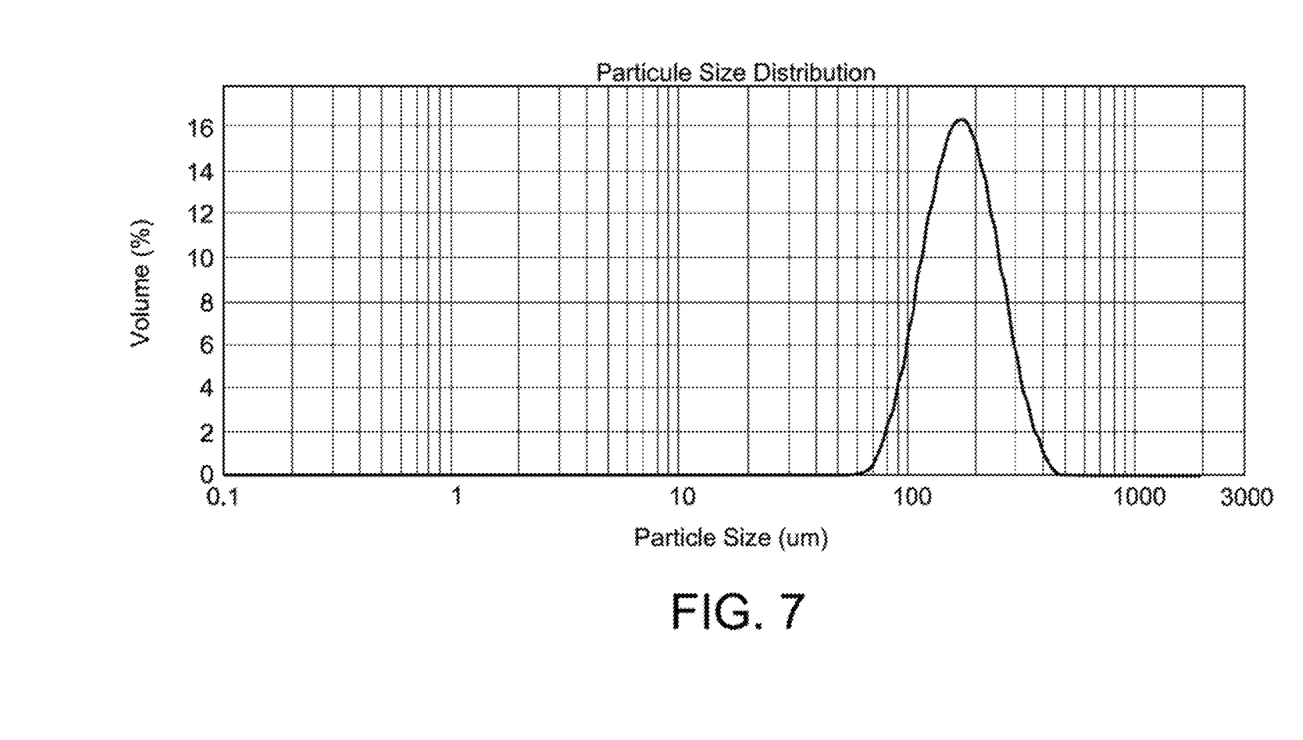
FIG. 7 illustrates the particle size distribution of an exemplary base polymer, which is an UHMWPE, used in some embodiments.

The UHMWPE powder in the starting material comprised 1,000 ppm of calcium stearate to improve the flowability of the powder. The UHMWPE powder was sieved to collect a powder fraction with particle size below 300 microns. FIG. 7 shows the particle size distribution of the UHMWPE powder obtained by laser diffraction analysis. The average particle size was 277.3 microns. The UHMWPE used has a molecular weight about 10 times higher than HDPE resins.

Figure 8:
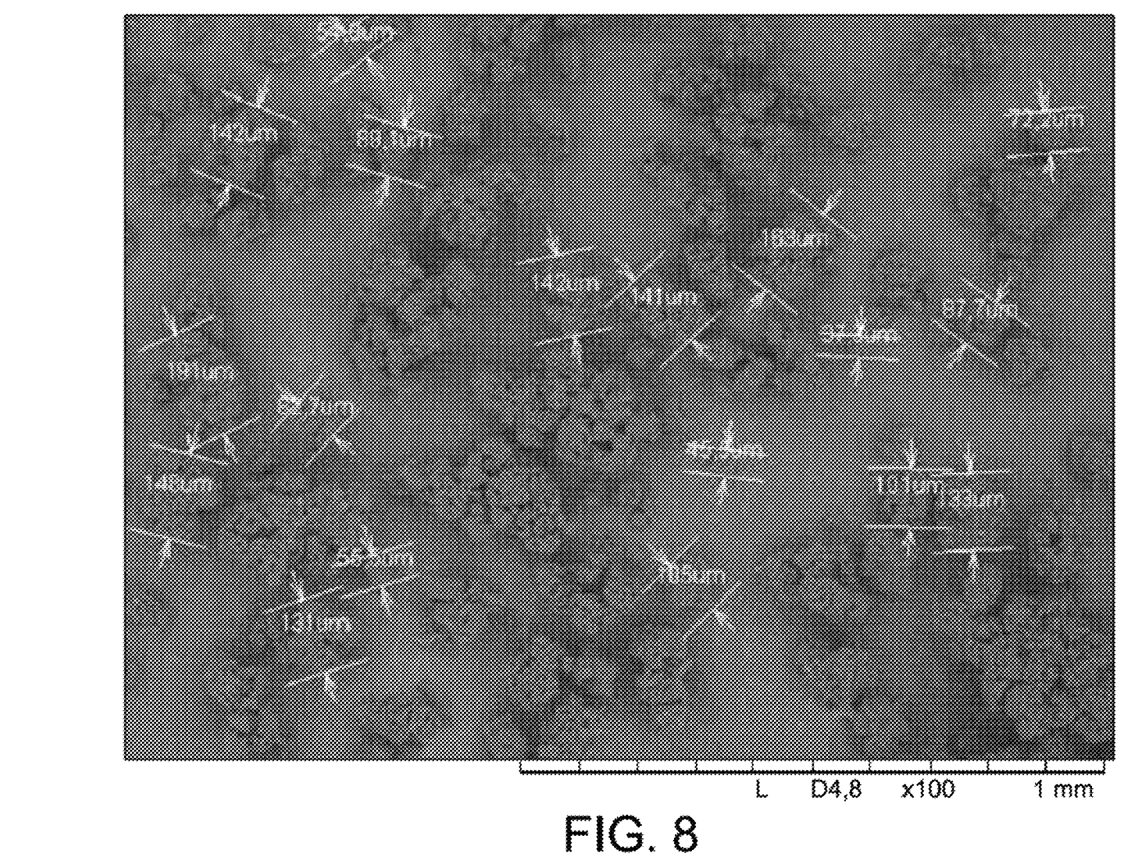
FIG. 8 is a scanning electron microscope (SEM) image illustrating the particle size distribution of an exemplary glue polymer, which is a HDPE, used in some embodiments.

The HDPE powder comprised 1000 ppm of calcium stearate and 1,000 ppm of antioxidant AOx 1076. The powder was sieved in order to collect a powder fraction with particle size below 250 microns and an average particle size of 129.8 microns. The determination of particle average particle size was made by electronic microscopy images as shown in FIG. 8. The HDPE power used have a melt flow rate of 9.3 g/10 minutes measured using the ASTM standard D1238 (190° C./21.6 kg).

The powders of UHMWPE and HDPE were mixed and used in a selective laser sintering process to produce the specimens to be evaluated.

Figure 9:
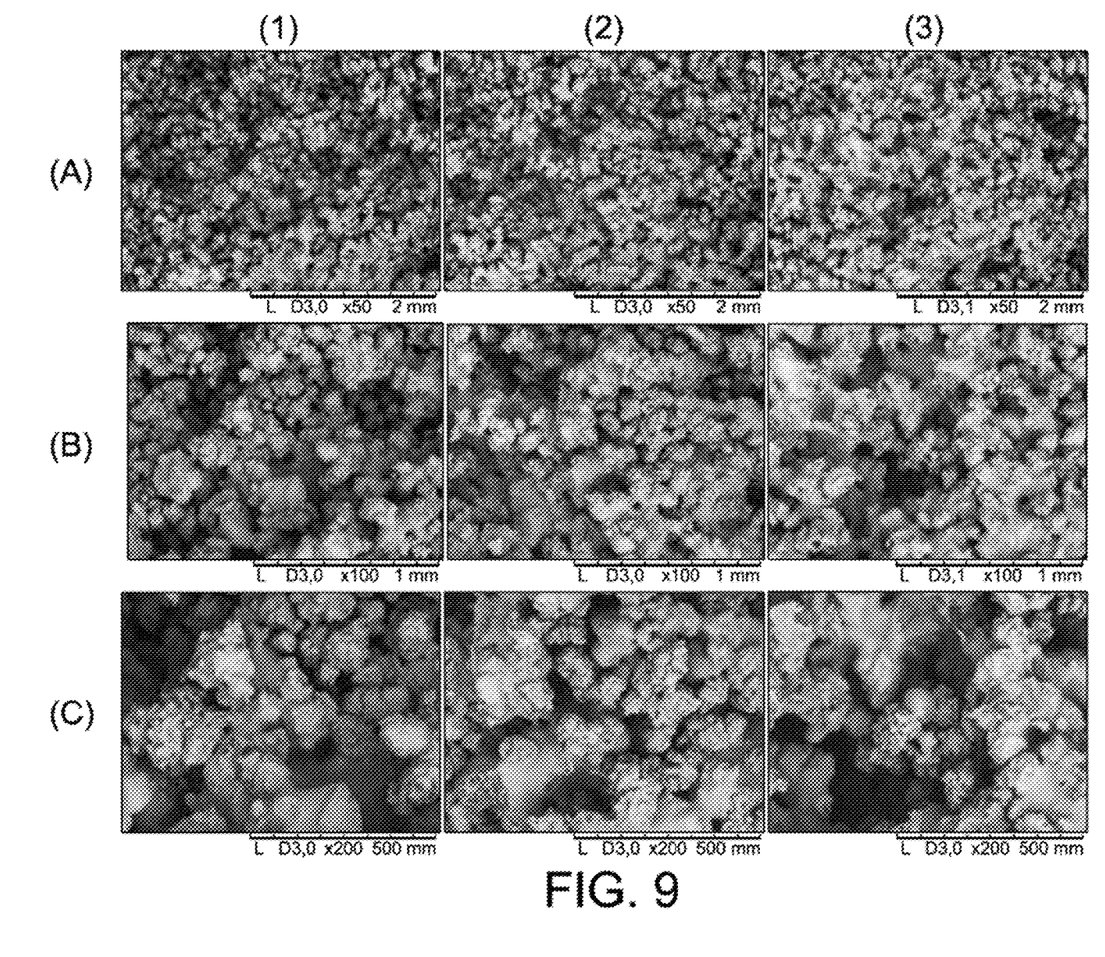
FIG. 9 shows SEM images of an exemplary porous article resulting from the UHMWPE of FIG. 7 and the HDPE of FIG. 8.

The sintering performance was evaluated using scanning electron microscopy (SEM, TM-1000/HITACHI). The specimens were prepared by cryogenic breakage and metallized with gold (20 mA by 60 seconds). The SEM images at magnification of 60×, 100× and 200× are shown in FIG. 9 including A(1)-(3), B(1)-(3), and C(1)-(3).

With the mixture of powders, the resulting printed specimen were obtained using the method as described. The specimen had an average pore diameter of 61.6 μm and an interstitial porosity of 47.6%, measured by using mercury porosimetry. The resulting porous article can be used for filtration applications.

The methods and system described herein may be at least partially embodied in the form of computer-implemented processes and apparatus for practicing those processes. The disclosed methods may also be at least partially embodied in the form of tangible, non-transient machine readable storage media encoded with computer program code. The media may include, for example, RAMs, ROMs, CD-ROMs, DVD-ROMs, BD-ROMs, hard disk drives, flash memories, or any other non-transient machine-readable storage medium, or any combination of these mediums, wherein, when the computer program code is loaded into and executed by a computer, the computer becomes an apparatus for practicing the method. The methods may also be at least partially embodied in the form of a computer into which computer program code is loaded and/or executed, such that, the computer becomes an apparatus for practicing the methods. When implemented on a general-purpose processor, the computer program code segments configure the processor to create specific logic circuits. The methods may alternatively be at least partially embodied in a digital signal processor formed of application specific integrated circuits for performing the methods.

Although the subject matter has been described in terms of exemplary embodiments, it is not limited thereto. Rather, the appended claims should be construed broadly, to include other variants and embodiments, which may be made by those skilled in the art.

What is claimed is:

1. An article having porous structure, comprising
from 50% to 99.9% by weight of a base polymer in the form of the article, the base polymer comprising a polyolefin; and
from 0.1% to 50% by weight of a glue polymer in the form of the article, wherein the glue polymer, prior to formation, has a particle size of less than or equal to 250 microns;
wherein the article has a porosity in a range of from about 5% to about 60% by volume, and the article has pores having an average size in a range of from about 0.1 micron to about 70 microns.

2. The article of claim 1, wherein the base polymer comprises ultra-high molecular weight polyethylene (UHMWPE).

3. The article of claim 1, wherein the glue polymer comprises high density polyethylene (HDPE) or polypropylene (PP).

4. The article of claim 1, further comprising equal to or less than 2% by weight of an additive.

5. A porous article made using additive manufacturing, comprising a base polymer in the form of the article, wherein the base polymer comprises polyolefin, and the article has a porosity less than 60% by volume and an average pore size of less than 70 microns; and a glue polymer in the form of the article, wherein the glue polymer, prior to formation, has a particle size of less than or equal to 250 microns.

6. The porous article of claim 5, wherein the base polymer has a content in a range of from 50% to 99.9% by weight.

7. The porous article of claim 5, comprising from 0.1% to 50% by weight of the glue polymer.

8. The porous article of claim 7, wherein the base polymer is UHMWPE and the glue polymer is HDPE.

\* \* \* \* \*